(12) United States Patent
Lee et al.

(10) Patent No.: US 7,630,441 B2
(45) Date of Patent: Dec. 8, 2009

(54) PIPELINING DECODING APPARATUS AND METHOD, AND COMPUTER-READABLE RECORDING MEDIUM FOR STORING COMPUTER PROGRAM FOR CONTROLLING THE PIPELINING DECODING APPARATUS

(75) Inventors: Sangjo Lee, Suwon-si (KR); Daesung Cho, Seoul (KR); Doohyun Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1044 days.

(21) Appl. No.: 11/124,080

(22) Filed: May 9, 2005

(65) Prior Publication Data

US 2006/0008001 A1  Jan. 12, 2006

(30) Foreign Application Priority Data

Jul. 6, 2004  (KR) ...................... 10-2004-0052307

(51) Int. Cl.
*H04N 7/12* (2006.01)
(52) U.S. Cl. ............. 375/240.25; 375/240; 375/240.01; 375/240.03; 375/240.29
(58) Field of Classification Search ................. 375/240, 375/240.01, 240.03, 240.12, 240.25, 240.29
See application file for complete search history.

(56) References Cited

U.S. PATENT DOCUMENTS 7,362,810 B2 * 4/2008 Wang ..................... 375/240.29
2003/0185298 A1 10/2003 Alvarez et al.

OTHER PUBLICATIONS

Tsung-Chien Chen, et al. "Analysis and Design of Macroblock Pipelining for H.264/AVC VLSI Architecture". IEEE. May 23, 2004. pp. 273-276.
List, Peter. "AHG Report: Loop Filter". Joint Video Team (JVT) of ISO/IEC MPEG & ITU-T VCEG. Feb. 1, 2002. pp. 1-3.
Zhong, Sheng. "Comments on Not Changing the Standard for Parallel Decoding". Joint Video Team (JVT) of ISO/IEC MPEG & ITU-T VCEG. Dec. 13, 2002. pp. 1-4.
MacInnis, Alexander. "Corrections to Loop Filter in the Case of MP-AFF". Joint Video Team (JVT) of ISO/IEC MPEG & ITU-T VCEG. Dec. 134, 2002. pp. 1-9.
Wang, L., et al. "Interlace Coding Tools for H.26L Video Coding". ITU Study Group 16—Video Coding Experts Group. Dec. 4, 2001. pp. 1-20.
De With, P.H.N., et al. "On the Design of Multimedia Software and Future System Architectures". SPIE. Jan. 19, 2004. pp. 58-69.
Li, Eric Q., et al. Implementation of H.264 Encoder on General Purpose Processors with Hyper-Threading Technology. SPIE Jan. 20, 2004. pp. 384-395.
Search Report issued by the European Patent Office on Aug. 29, 2008.

* cited by examiner

*Primary Examiner*—Allen Wong
(74) *Attorney, Agent, or Firm*—NSIP Law

(57) ABSTRACT

A pipelining decoding apparatus and method, and a computer-readable recording medium for storing a computer program for controlling the pipelining decoding apparatus. Pixel values of each of the recovered images corresponding to previous macroblocks are stored as neighboring pixel values. Motion is predicted in a picture corresponding to a current macro block using the stored neighboring pixel values. An original image is recovered from the current macroblock using the result of the prediction of the motion in the picture and residue information. Some of the pixel values of the recovered image corresponding to the current macroblock are stored and the recovered image is deblocking-filtered.

18 Claims, 8 Drawing Sheets

FIG. 5A

| Q | A | B | C | D | E | F | G | H |
|---|---|---|---|---|---|---|---|---|
| I | ↓ | ↓ | ↓ | ↓ | | | | |
| J | | | | | | | | |
| K | | | | | | | | |
| L | ↓ | ↓ | ↓ | ↓ | | | | |

FIG. 5B

| Q | A | B | C | D | E | F | G | H |
|---|---|---|---|---|---|---|---|---|
| I | → | → | → | → | | | | |
| J | → | → | → | → | | | | |
| K | → | → | → | → | | | | |
| L | → | → | → | → | | | | |

FIG. 5C

| Q | A | B | C | D | E | F | G | H |
|---|---|---|---|---|---|---|---|---|
| I | ↙ | ↙ | ↙ | ↙ | | | | |
| J | ↙ | ↙ | ↙ | ↙ | | | | |
| K | ↙ | ↙ | ↙ | ↙ | | | | |
| L | ↙ | ↙ | ↙ | ↙ | | | | |

FIG. 8

| CLASSIFICATION | MBs TO BE PROCESSED | | | | | | | | |
|---|---|---|---|---|---|---|---|---|---|
| F$_1$ | 1 | 2 | 3 | 4 | ••• | n+2 | | | |
| F$_2$ | | 1 | 2 | 3 | ••• | n+1 | n+2 | | |
| F$_3$ | | | 1 | 2 | ••• | n | n+1 | n+2 | |
| F$_4$ | | | | 1 | ••• | n−1 | n | n+1 | n+2 |

180

TIME →

FIG. 9

| 0 | 1 | 2 | 3 | 4 | 5 | 6 | 7 |
|---|---|---|---|---|---|---|---|
| P4(8) | 9 | 10 | 11 | 12 | 13 | 14 | 15 |
| 16 | 17 | P3(18) | P2(19) | P1(20) | 21 | 22 | 23 |

| 0 | 1 | 2 | 3 | 4 | 5 | 6 | 7 |
|---|---|---|---|---|---|---|---|
| 8 | 9 | 10 | 11 | 12 | 13 | 14 | 15 |
| 16 | P4(17) | P3(18) | P2(19) | P1(20) | 21 | 22 | 23 |

226 — P4(17), 224 — P3(18), 222 — P2(19), 220 — P1(20)

PIPELINING DECODING APPARATUS AND METHOD, AND COMPUTER-READABLE RECORDING MEDIUM FOR STORING COMPUTER PROGRAM FOR CONTROLLING THE PIPELINING DECODING APPARATUS

BACKGROUND OF THE INVENTION

This application claims the benefit of Korean Patent Application No. 2004-52307, filed on Jul. 6, 2004, in the Korean Intellectual Property Office, the disclosure of which is incorporated herein by reference.

1. Field of the Invention

The present invention relates to decoding of data, and more particularly, to an apparatus for and a method of pipelining-decoding a coded bitstream, and a computer-readable recording medium for storing a computer program for controlling the apparatus.

2. Description of the Related Art

U.S. Patent Publication No. 20030185298A1 discloses a conventional decoding method, entitled "Method of Operating a Video Decoding System." In the conventional decoding method, Moving Picture Experts Group (MPEG)-2 decoding is divided into several modules: variable length decoding (VLD), inverse quantization (IQ), inverse discrete cosine transform (IDCT), pixel filtering, and motion compensation (MC), performed using a pipelining method. Unlike the method disclosed in the above mentioned patent publication or other conventional decoding methods, for example, MPEG-1, MPEG-4, H.261, H.263, or the like, H.264/advanced video coding (AVC) includes, in decoding, deblocking filtering as one among post processes, in order to improve picture quality and compression efficiency.

However, where performed using a pipelining method, decoding with deblocking filtering causes trouble. For example, pixel values which have not undergone deblocking filtering are required to execute intra-prediction during MC. However, where deblocking filtering is performed using the pipelining method, deblocking-filtered pixel values are used during intra-prediction. Thus, decoding is not correctly performed. In order to avoid this problem, in the case of H.264/AVC, a deblocking filtering module is performed in the unit of each picture, without using the pipelining method separately from the other modules of the decoding method.

As described above, the conventional decoding method is slowly performed with not using the pipelining method for deblocking filtering. In particular, an increase in the number of slices of a picture causes a more serious problem. In addition, pixel values which have been recovered using the results of intra-prediction are stored in an external memory and then fetched from the external memory to perform deblocking filtering, thereby lowering the practicability of a data bus. As a result, accessing the external memory induces delay, thereby further slowing the decoding.

SUMMARY OF THE INVENTION

An aspect of the present invention provides a pipelining decoding apparatus and a method of performing decoding including deblocking filtering in the unit of a macro block using a pipelining method.

An aspect of the present invention also provides a computer-readable recording medium for storing a computer program for controlling the pipelining decoding apparatus.

According to an aspect of the present invention, a pipelining decoding apparatus for receiving and decoding a coded bitstream includes: a storage unit which stores some of the pixel values of each of recovered images corresponding to previous macroblocks as neighboring pixel values; a motion predictor which predicts motion in a picture corresponding to a current macroblock using the neighboring pixel values read from the storage unit, recovers the original image from the current macroblock using the result of the prediction of the motion in the picture and residue information, and stores some of the pixel values of the recovered image corresponding to the current macroblock in the storage unit; and a deblocking filter which deblocking-filters the recovered image. The recovery of the original image with respect to an nth macroblock in the motion predictor and the deblocking-filtering of a recovered image corresponding to an n−1th macroblock in the deblocking filter are performed simultaneously.

According to another aspect of the present invention, a pipelining decoding method of receiving and decoding a coded bitstream includes: reading corresponding neighboring pixel values among stored neighboring pixel values of some of pixel values of recovered images corresponding to previous macroblocks; predicting motion in a picture corresponding to a current macroblock using the read neighboring pixel values; recovering the original image from the current macroblock using the result of the prediction of the motion in the picture and residue information; storing some of the pixel values included in a recovered image corresponding to the current macroblock; and deblocking-filtering the recovered image. The reading of the corresponding neighboring pixel values, the prediction of the motion in the picture, the recovery of the original image, and the storing of some of the pixel values of the recovered image are performed with respect to an nth macroblock, and simultaneously, the deblocking-filtering of the recovered image is performed with respect to an n−1th macroblock.

According to another aspect of the present invention, a computer-readable recording medium, for storing at least one computer program for controlling a pipelining decoding apparatus for receiving and decoding a coded bitstream, includes: reading corresponding neighboring pixel values among stored neighboring pixel values of some of pixel values of each of the recovered images corresponding to previous macroblocks; predicting motion in a picture corresponding to a current macroblock using the read neighboring pixel values; recovering the original image from the current macroblock using the result of the prediction of the motion in the picture and residue information; storing some of the pixel values included in the recovered image corresponding to the current macroblock; and deblocking-filtering the recovered image. The reading of the corresponding neighboring pixel values, the prediction of the motion in the picture, the recovery of the original image, and the storing of some of the pixel values of the recovered image are performed with respect to an nth macroblock, and simultaneously, the deblocking-filtering of the recovered image is performed with respect to an n−1th macroblock.

Additional aspects and/or advantages of the invention will be set forth in part in the description which follows and, in part, will be obvious from the description, or may be learned by practice of the invention

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 5A through 5F are views showing examples of relationships between directions for predicting motion in a picture and neighboring pixel values used for predicting motion in a picture;

FIG. 8 is a view for explaining a pipelining method, according to an embodiment of the present invention;

FIG. 9 is a view for explaining the conventional decoding method; and

FIG. 10 is a view for explaining the pipelining decoding apparatus and method of the present invention.

DETAILED DESCRIPTION OF THE EMBODIMENTS

Figure 1:
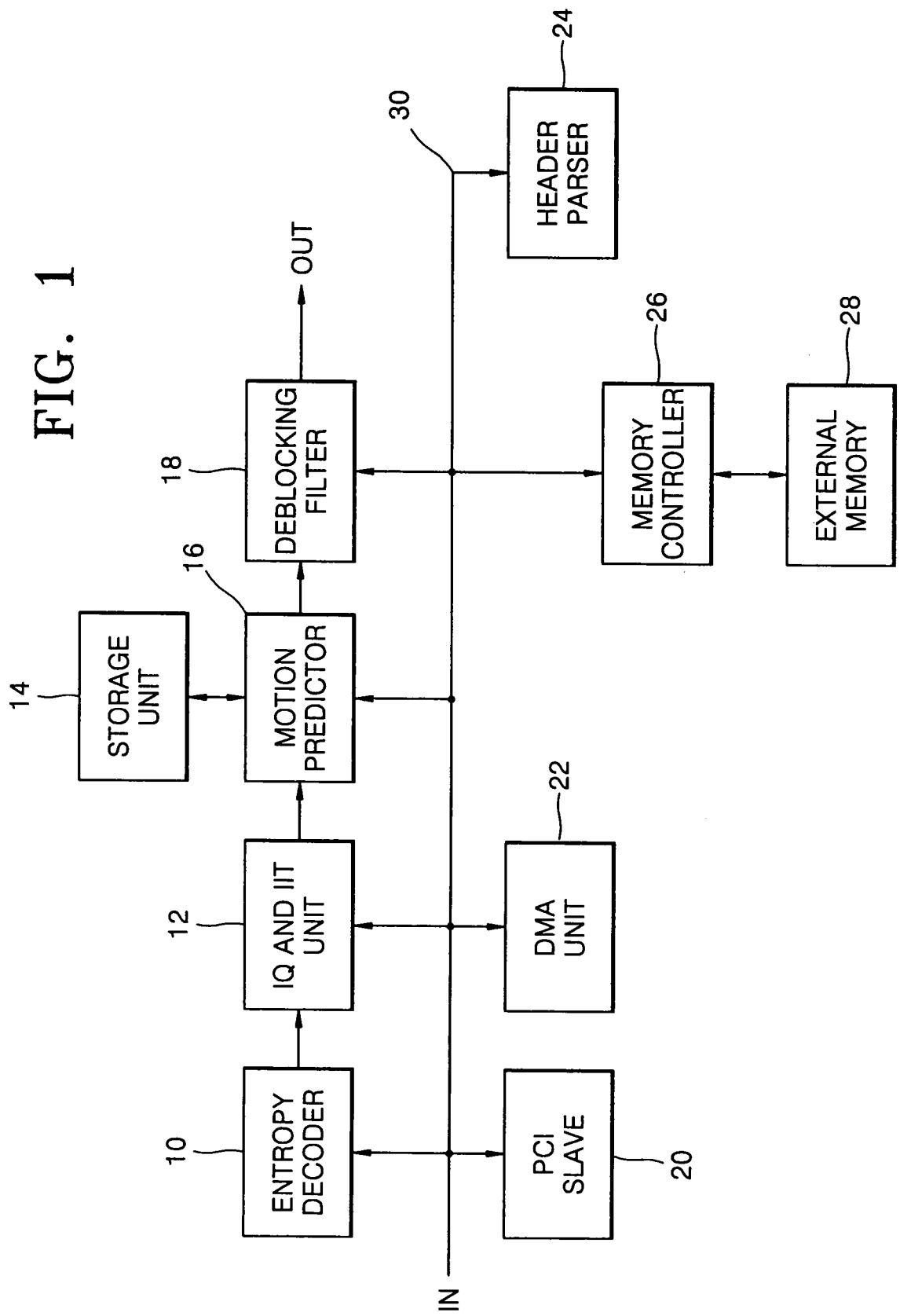
FIG. 1 is a block diagram of a pipelining decoding apparatus, according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram of a pipelining decoding apparatus, according to an embodiment of the present invention. Referring to FIG. 1, the pipelining decoding apparatus includes an entropy decoder 10, an IQ and inverse integer transform (IIT) unit 12, a storage unit 14, a motion predictor 16, a deblocking filter 18, a peripheral component interconnect (PCI) slave 20, a direct memory access (DMA) unit 22, a header parser 24, a memory controller 26, and an external memory 28.

Figure 2:
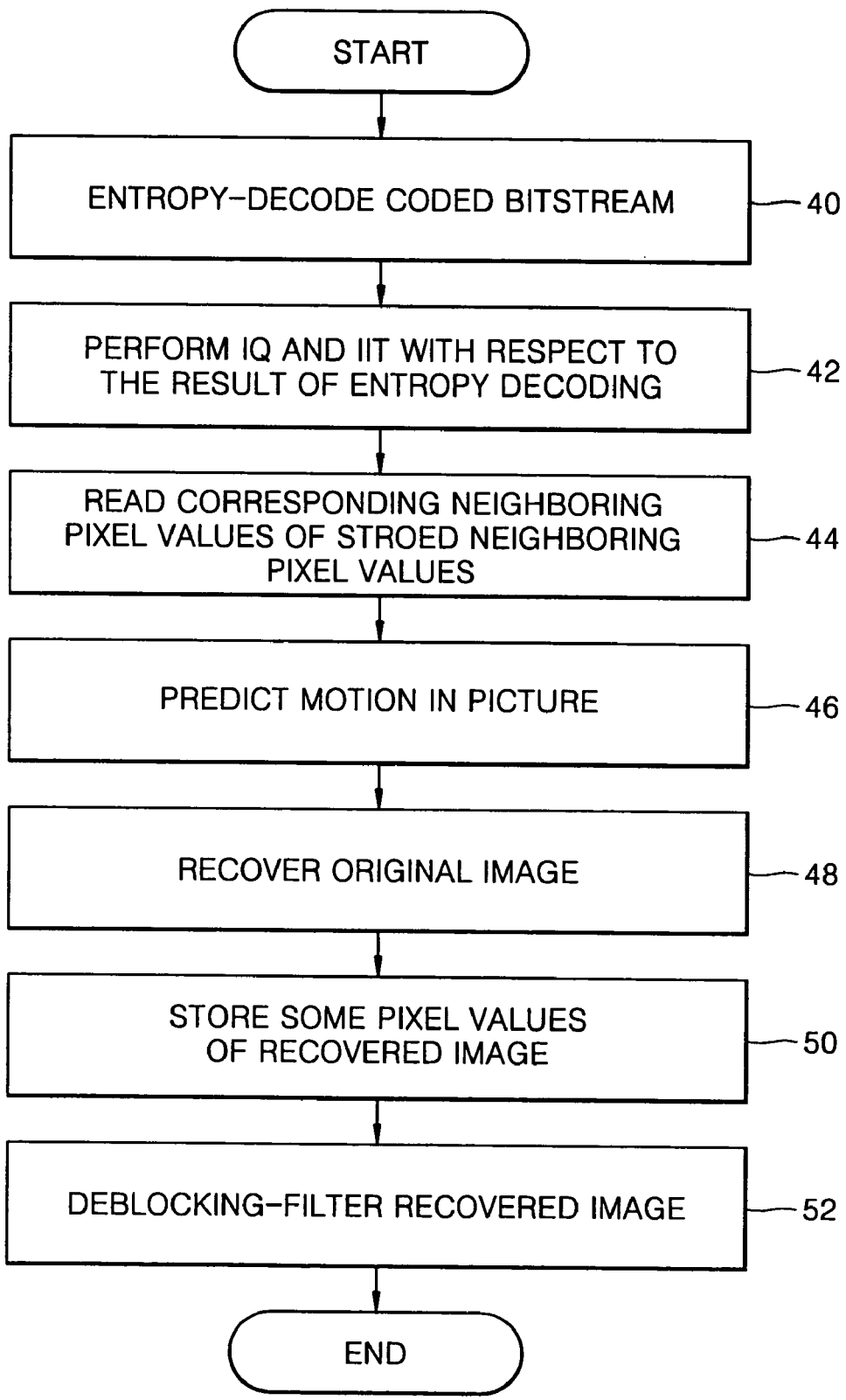
FIG. 2 is a flowchart for explaining a pipelining decoding method, according to an embodiment of the present invention.

FIG. 2 is a flowchart for explaining a pipelining decoding method, according to an embodiment of the present invention. Here, the pipelining decoding method includes operations 40 and 42 for performing entropy decoding, IQ, and IIT, operations 44, 46, 48, and 50 for recovering an original image using motion predicted with reference to corresponding neighboring pixel values, and operation 52 for performing deblocking-filtering.

In operation 40, the entropy decoder 10 of FIG. 1 receives a coded bitstream via an input node IN, entropy-decodes the coded bitstream, and outputs the result to the IQ and IIT unit 12.

The pipelining decoding apparatus and method disclosed herein may be applied to a COder and/or DECoder (CODEC) such as a CODEC which employs an H.264/Advanced Video coding. In the case of H.264/AVC, video coding is generally performed in a unit of each network abstraction layer (NAL). NAL data includes a video coding layer (VCL) NAL including a substantially coded video bitstream and a non-VCL NAL including appended information for decoding. Here, the VCL NAL includes a slice header and data, each piece of which includes a plurality of MBs. The entropy decoder 10 of FIG. 1 entropy-decodes the coded bitstream input via the input node IN in the unit of each MB.

At operation 42, the IQ and IIT unit 12 performs IQ on the entropy-decoded result input from the entropy decoder 10, performs IIT on the IQ result, and outputs the IIT result as residue information to the motion predictor 16.

At operation 44, the motion predictor 16 reads corresponding neighboring pixel values from the storage unit 14 before the motion of a current MB is predicted. To read the corresponding neighboring pixel values, the storage unit 14 stores some of the pixel values included in each of the recovered images, corresponding to previous MBs as neighboring pixel values. According to an aspect of the present invention, the storage unit 14 may be a static random access memory (SRAM).

At operation 46, the motion predictor 16 predicts motion in a picture corresponding to the current MB using the corresponding neighboring pixel values read from the storage unit 14. Here, "predicting the motion in the picture" means "performing intra-prediction."

For the following reasons, the neighboring pixel values are used where the motion predictor 16 predicts motion in the picture corresponding to the current MB.

Figure 3:
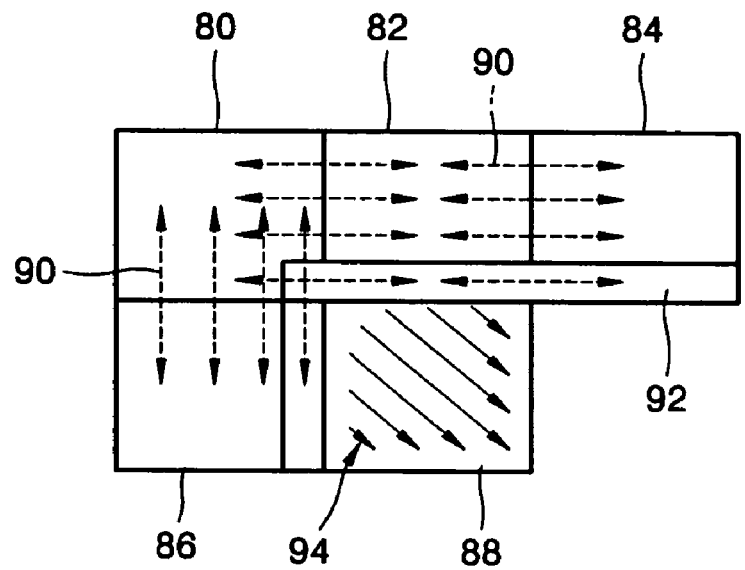
FIG. 3 is a view showing data for explaining a conventional decoding method.

FIG. 3 is a view showing data for explaining a conventional decoding method. Here, the data includes MBs 80, 82, 84, 86, and 88, vertical and horizontal arrows 90 denote a process of performing deblocking filtering, and diagonal arrows 94 denote a process of performing intra-prediction. Also, the MBs 80, 82, 84, 86, and 88 are sequentially decoded.

Where pipelining decoding is performed in a conventional H.264/AVC decoding method, a process of recovering an original image from the MB 88 and a process of deblocking-filtering the recovered image of the MB 86 are performed simultaneously and subsequently to completing deblocking-filtering of the MBs 80, 82, and 84. Thus, pixel values 92 of previous MBs 80, 82, and 84 used for predicting motion in a picture corresponding to the MB 88 are previously deblocking-filtered values. Therefore, an error may occur in the prediction of motion in the picture corresponding to the MB 88.

Figure 4:
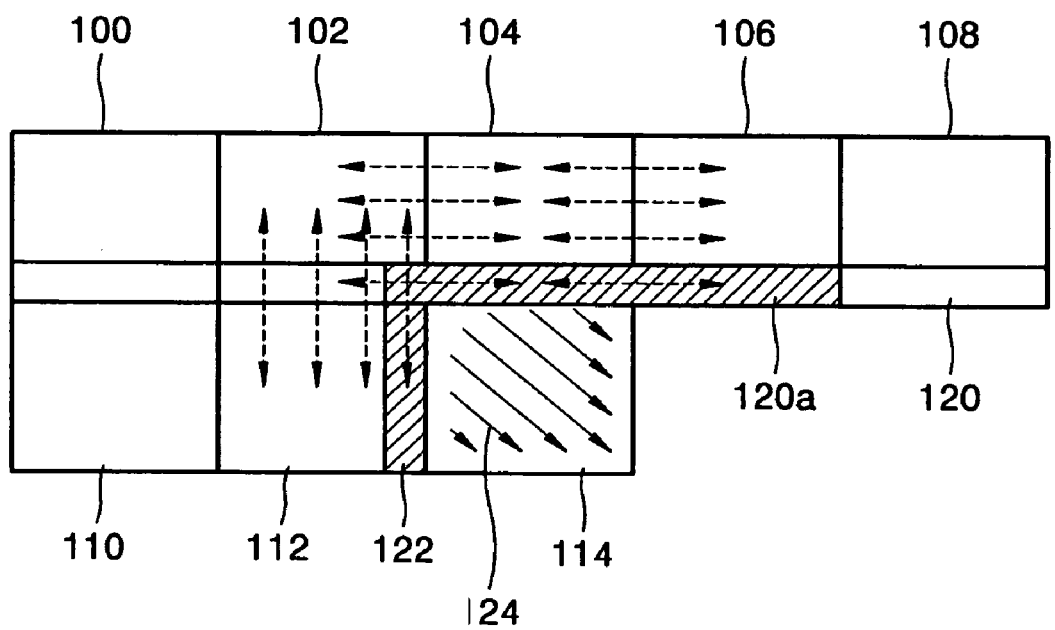
FIG. 4 is an exemplary view showing macroblocks (MBs) for explaining the operation of a storage unit and a motion predictor of FIG. 1, according to an embodiment of the present invention.

FIG. 4 is an exemplary view showing MBs for explaining the operation of the storage unit 14 and the motion predictor 16 of FIG. 1, according to an embodiment of the present invention. Here, it is assumed that decoding is performed in the order of MBs 100, 102, 104, 106, 108, 110, 112, and 114.

To solve a problem as described with reference to FIG. 3, pixel values 120 and 122 to be used for predicting motion of the MB 114 are stored as neighboring pixel values in the storage unit 14 before the pixel values 120 and 122 are deblocking-filtered. Thus, the motion predictor 16 may predict motion in a picture corresponding to the MB 114 without error, using the neighboring pixel values 120 and 122 stored in the storage unit 14, which are not yet deblocking-filtered.

To obtain the neighboring pixel values, the storage unit 14 stores the pixel values 122 neighboring the current MB 114 among pixel values of the recovered image corresponding to the previous MB 112 horizontally adjacent to the current MB 114 as neighboring pixel values. Also, the storage unit 14 stores pixel values 120a neighboring the current MB 114 among pixel values of the recovered images corresponding to the previous MBs 102, 104, and 106 vertically and diagonally adjacent to the current MB 114 as neighboring pixels.

For example, where a picture of size 720×480 uses a YUV format of 4:2:0, the maximum width and length of the neighboring pixel values 120 stored in the storage unit 14 may be 720×1×1.5=1080 bytes and more than 1.5 bytes, respectively. The width and maximum length of the neighboring pixel values 122 stored in the storage unit 14 may be more than 1.5 bytes and s×1×1.5 bytes, respectively, where s is a length of an MB in pixels. For example, where s=16, the maximum length of the neighboring pixel values 122 may be 24 bytes.

Neighboring pixel values, of the neighboring pixel values 120 and 122 of FIG. 4, used for predicting motion in the picture corresponding to the MB 114 may vary with the direction of arrows 124. This will be described below.

FIGS. 5A through 5F are views showing examples of relationships between directions for predicting motion in a picture and neighboring pixel values used for predicting motion in a picture.

Figure 5D:
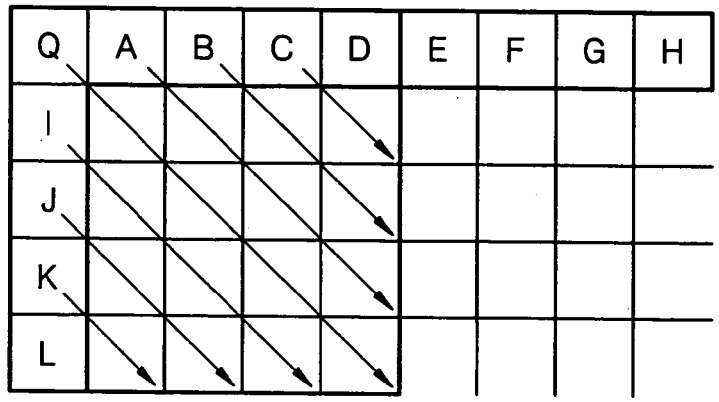
Figure 5E:
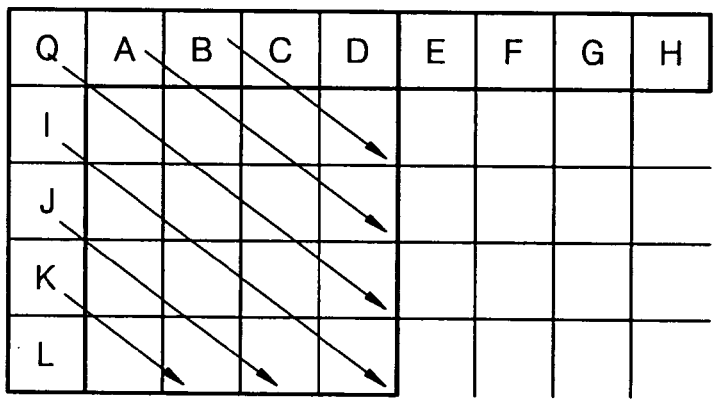
Figure 5F:
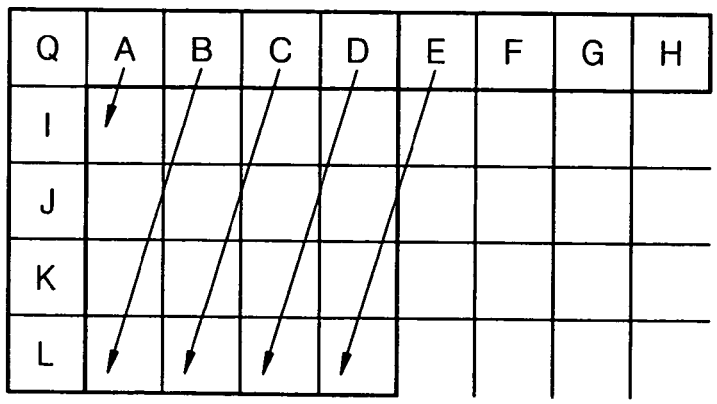

As shown in FIG. 5A, where motion prediction is performed in a vertical direction, neighboring pixel values A, B, C, and D are used. As shown in FIG. 5B, where motion prediction is performed in a horizontal direction, neighboring pixel values I, J, K, and L are used. As shown in FIG. 5C, where motion prediction is performed in a left and down diagonal direction, neighboring pixel values B, C, D, E, F, G, and H are used. As shown in FIG. 5D, where motion prediction is performed in a right and down diagonal direction, neighboring pixel values A, B, C, I, J, K, L, and Q are used. As shown in FIG. 5E, where motion prediction is performed in a right and slightly down diagonal direction, neighboring pixel values A, B, I, J, K, L, and Q are used. As shown in FIG. 5F, where motion prediction is performed in a slightly left and down diagonal direction, neighboring pixel values A, B, C, D, and E are used.

As can be seen in FIGS. 5A through 5F, motion in the picture can be predicted in any direction, but only the neighboring pixel values A through L and Q are used.

The direction for predicting motion in a picture corresponding to each MB using the motion predictor 16 is determined by a coder (not shown) and then included as appended information in a non-VCL NAL. In other words, the motion predictor 16 analyzes the direction for predicting motion in a picture using the decoded non-VCL NAL and reads neighboring pixel values corresponding to the analysis result from the storage unit 14. Such a direction may vary according to each MB.

All of the above-described MBs of FIG. 4 are frames or fields. However, where the MBs are coded in an MB adaptive Frame fields (MBAFF) mode, different types of MBs may be adjacent. Here, a pair of vertically adjacent MBs of same types are coded in the MBAFF mode. In other words, MBs of each pair are frames or fields. In general, one field includes top and bottom fields. Here, the top field refers to an even field consisting of an even number of scanning lines, and the bottom field means an odd field consisting of an odd number of scanning lines. Neighboring pixel values stored in the storage unit 14 and neighboring pixel values required for predicting the motion of a current MB in the motion predictor 16 may vary depending on the types of current and previous MBs as described below.

Figure 6:
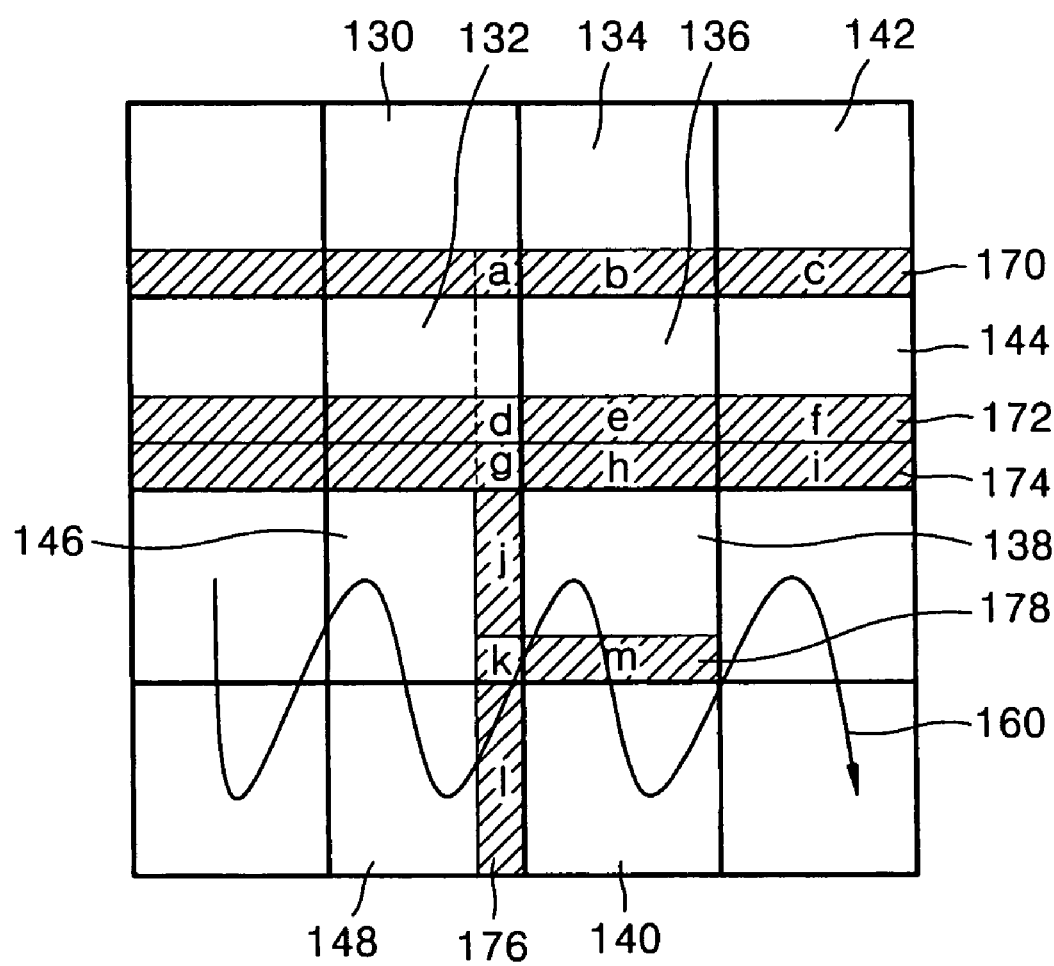
FIG. 6 is an exemplary view showing a portion of MBs for explaining the operation of the storage unit and the motion predictor in an MB Adaptive Frame Field (MBAFF) mode, according to another embodiment of the present invention.

FIG. 6 is an exemplary view showing a portion of MBs for explaining the operation of the storage unit 14 and the motion predictor 16 in an MBAFF mode, according to another embodiment of the present invention. Here, it is assumed that reference characters a, b, c, d, e, f, g, h, i, j, k, l and m denote pixel values, MBs are scanned and decoded in a direction indicated by an arrow 160, and two pairs of MBs 134 and 136, and 138 and 140, are coded.

FIGS. 7A through 7D are views showing examples of types of MBs 134, 136, 138, and 140 in the MBAFF mode.

The storage unit 14 stores neighboring pixel values 170, 172, 174, 176, and 178 to predict the motion of the MBs 138 and 140 of FIG. 6. Here, the neighboring pixel values 172 are located just above the neighboring pixel values 174. In FIGS. 7A through 7D, the MBs 134, 136, 138, and 140 are shown as different types of MBs. Thus, the neighboring pixel values 170, 172, 174, 176, and 178 to be used for predicting the motion of the MBs 138 and 140 may vary as described below.

Figure 7:
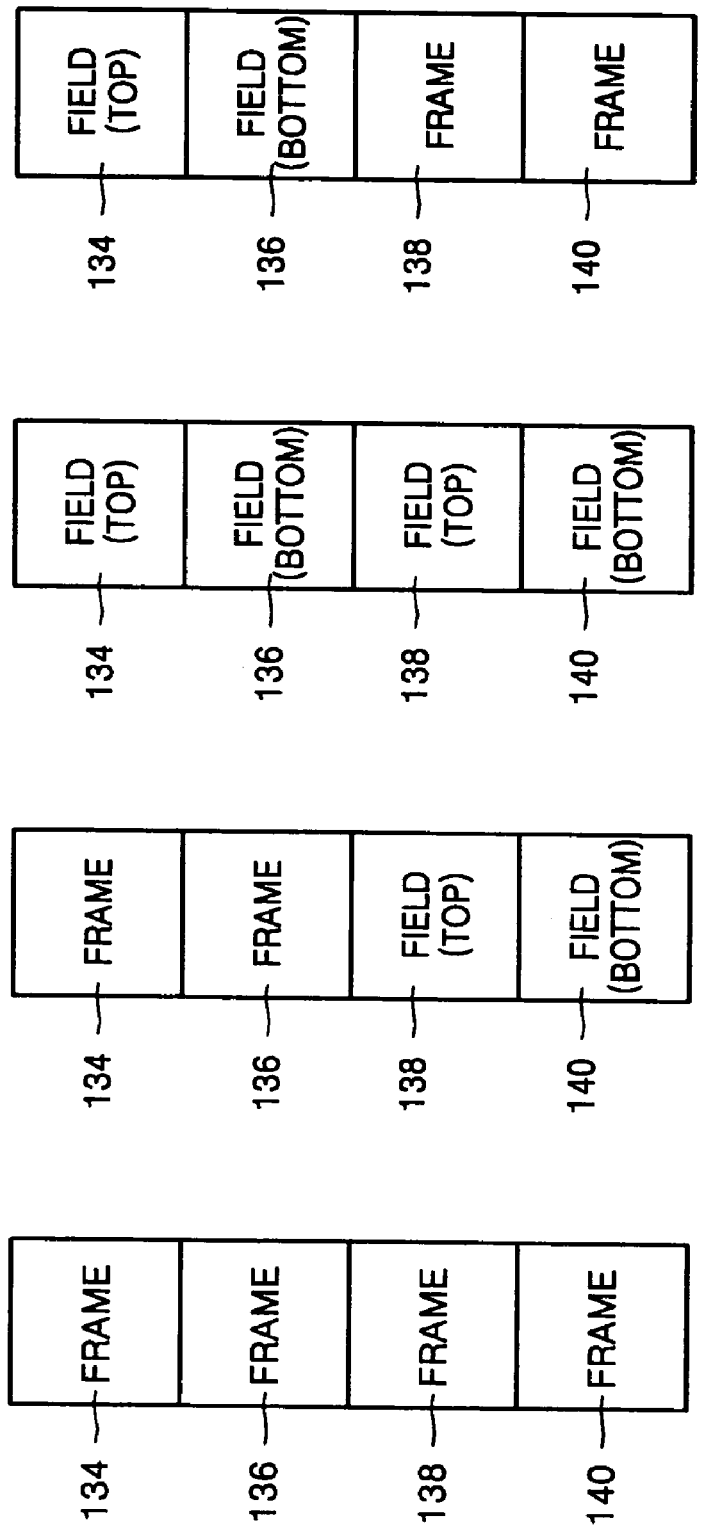
FIGS. 7A through 7D are views showing examples of the types of MBs in the MBAFF mode.

As shown in FIG. 7A, where all of the MBs 134, 136, 138, and 140 are frames, the neighboring pixel values 174 and 176 stored in the storage unit 14 are used to predict the motion of the MB 138, and the neighboring pixel values 176 and 178 stored in the storage unit 14 are used to predict the motion of the MB 140. For example, where all of the MBs 130, 132, 142, 144, 146, and 148 neighboring the MBs 134, 136, 138, and 140 are frames, neighboring pixel values g through k are used to predict the motion of the MB 138, and neighboring pixel values k through m are used to predict the motion of the MB 140.

Where the MBs 134 and 136 are frames, and the MBs 138 and 140 are top and bottom fields, respectively, as shown in FIG. 7B, the neighboring pixel values 172 and 176 stored in the storage unit 14 are used to predict the motion of the MB 138, and the neighboring pixel values 174 and 176 stored in the storage unit 14 are used to predict the motion of the MB 140. For example, where all of the MBs 130, 132, 142, and 144 are frames, and the MBs 146 and 148 are top and bottom fields, respectively, neighboring pixel values d through g and j through l are used to predict the motion of the MB 138, and the neighboring pixel values g through l are used to predict the motion of the MB 140.

Where the MBs 134 and 138 are top fields, and the MBs 136 and 140 are bottom fields, as shown in FIG. 7C, neighboring pixel values 170 and 176 stored in the storage unit 14 are used to predict the motion of the MB 138, and the neighboring pixel values 174 and 176 stored in the storage unit 14 are used to predict the motion of the MB 140. For example, where the MBs 130, 142, and 146 are top fields, and the MBs 132, 144, and 148 are bottom fields, neighboring pixel values a through c, j and k are used to predict the motion of the MB 138, and neighboring pixel values h, i, and l are used to predict the motion of the MB 140.

Where the MBs 134 and 136 are top and bottom fields, respectively, and the MBs 138 and 140 are frames, as shown in FIG. 7D, the neighboring pixel values 174 and 176 stored in the storage unit 14 are used to predict the motion of the MB 138, and the neighboring pixel values 176 and 178 stored in the storage unit 14 are used to predict the motion of the MB 140. For example, where the MBs 130 and 142 are top fields, the MBs 132 and 144 are bottom fields, and the MBs 146 and 148 are frames, the neighboring pixel values g through k are used to predict the motion of the MB 138, and the neighboring pixel values k through m are used to predict the motion of the MB 140.

As described above, neighboring pixel values read out to the motion predictor 16 from the storage unit 14 vary depending on the types of the MBs 130, 132, 134, 136, 138, 140, 142, 144, 146, and 148.

For example, the types of the MBs 130, 132, 134, 136, 138, 140, 142, 144, 146, and 148 are determined by the coder (not shown) and then included as appended information in the VCL NAL. Thus, the motion predictor 16 analyzes the types of current and previous MBs using the decoded VCL NAL and reads neighboring pixel values corresponding to the analysis result from the storage unit 14.

For reading neighboring pixel values from the storage unit 14, the storage unit 14 stores the pixel values j and k neighboring the current MB 138 among pixel values of the recovered image corresponding to the previous MB 146 horizontally neighboring the current MB 138 as neighboring pixel values. Also, the storage unit 14 stores the pixel values a through l neighboring the current MB 138 among pixel values of each of the recovered images corresponding to the previous MBs 130, 132, 134, 136, 142, 144, 146, and 148 vertically and diagonally neighboring the current MB 138, as neighboring pixel values.

Also, the storage unit 14 stores the pixel value I neighboring the current MB 140 among pixel values of the recovered image corresponding to the previous MB 148 horizontally neighboring the current MB 140 as a neighboring pixel value. Further, the storage unit 14 stores the pixel values a through m neighboring the current MB 140 among pixel values of each of the recovered images corresponding to the previous MBs 130, 132, 134, 136, 138, 142, 144, 146, and 148 vertically and diagonally neighboring the current MB 140 as neighboring pixel values.

For example, with a picture of size X×Z, the maximum width and length of each of the neighboring pixel values 170, 172, and 174 stored in the storage unit 14 are X×1.5×n' bytes and more than 1.5 bytes, respectively. Here, n' is 1, 2, or 3. In this case, the maximum width and length of the neighboring pixel value 178 stored in the storage unit 14 may be t×1×1.5 bytes (where t is the width of an MB in pixels) and more than 1.5 bytes, respectively. Also, the width and maximum length of the neighboring pixel value 176 stored in the storage unit 14 may be more than 1.5 bytes and 2s×1×1.5 bytes, respectively.

After operation 46, in operation 48, the motion predictor 16 recovers the original image from a current MB using the result of the prediction of the motion in the picture and the residue information input from the IQ and IIT unit 12, and outputs the recovery result to the deblocking filter 18. Here, the motion predictor 16 may also predict motion between pictures and recover the original image from a current MB using the results of the prediction between the pictures and residue information. "Predicting the motion between the pictures" refers to "performing inter-prediction."

After operation 48, in operation 50, the motion predictor 16 stores some of the pixel values of the recovered image corresponding to the current MB as neighboring pixel values to be used for the next MB in the storage unit 14. For example, the motion predictor 16 stores pixel values in at least one column in the rightmost position and in at least one row in the lowest position among the pixel values of the recovered image corresponding to the current MB as neighboring pixel values to be used for predicting the motion of the next MB in the storage unit 14.

For example, referring to FIG. 6, where MB 138 is a current MB, the neighboring pixel value m is stored in the storage unit 14. Where MB 146 is a current MB, the neighboring pixel values j and k are stored in the storage unit 14. Where MB 148 is a current MB, the neighboring pixel value I is stored in the storage unit 14. Where MB 136 is a current MB, the neighboring pixel values e and h are stored in the storage unit 14.

Referring again to FIG. 2, after operation 50, the deblocking filter 18 deblocking-filters the recovered image of the current MB input from the motion predictor 16 and outputs the result of deblocking-filtering via an output node OUT (FIG. 1).

FIG. 8 is a view for explaining a pipelining method, according to an embodiment of the present invention.

The entropy decoder 10, the IQ and IIT unit 12, the motion predictor 16, and the deblocking filter 18 of FIG. 1 operate using a pipelining method. In other words, where operation 40 performed by the entropy decoder 10 is designated F1, operation 42 performed by the IQ and IIT unit 12 is designated F2, operations 44, 46, 48, and 50 performed by the motion predictor 16 are designated F3, and operation 52 performed by the deblocking filter 18 is designated F4, the processing of MBs via the entropy decoder 10, the IQ and IIT unit 12, the motion predictor 16, and the deblocking filter 18 using a pipelining method will be described with reference to FIG. 8.

For help in the comprehension of aspects of the present invention, where the entropy decoder 10 sequentially receives n−1th, nth, n+1th, and n+2th MBs, the pipelining decoding apparatus of FIG. 1 operates using the pipelining method as described with reference to FIG. 8.

At a point in time 180 as shown in FIG. 8, the entropy decoder 10 performs F1 with respect to the n+2th MB, the IQ and IIT unit 12 performs F2 with respect to the n+1th MB, the motion predictor 16 performs F3 with respect to the nth MB, and the deblocking filter 18 performs F4 with respect to the n−1th MB.

The pipelining decoding apparatus of FIG. 1 continuously performs the pipelining decoding method of FIG. 2 in the unit of each MB while the VCL NAL is input via the input node IN.

The pipelining decoding apparatus disclosed herein is not limited to the above-described example of FIG. 1. For example, the pipelining decoding apparatus may include the entropy decoder 10 and the IQ and IIT unit 12 of FIG. 1, so that the motion predictor 16 extracts residue information required for recovering an original image. However, where the residue information is input from an external source, the pipelining decoding apparatus of FIG. 1 does not need to include the entropy decoder 10 and the IQ and IIT unit 12.

Meanwhile, the header parser 24 of FIG. 1 serves to decode a non-VCL NAL or a slice header in the unit of NAL or slice, respectively. Here, the external memory 28 stores various kinds of data for a decoding operation of the pipelining decoding apparatus of FIG. 1, and may be a dynamic RAM (DRAM). The memory controller 26 controls the operation of the external memory 28. The PCI slave 20 and the DMA unit 22 of FIG. 1 are peripheral devices which drive the elements of FIG. 1.

Where the coded bitstream input via the input node IN is slice data, only the entropy decoder 10, the IQ and IIT unit 12, the storage unit 14, the motion predictor 16, the deblocking filter 18, the PCI slave 20, the DMA unit 22, the memory controller 26, and the external memory 28 operate. However, where the coded bitstream input via the input node IN is not slice data, only the PCI slave 20, the DMA unit 22, the header parser 24, the memory controller 26, and the external memory 28 operate.

Here, the PCI slave 20 and the DMA unit 22 may be used as data input units in place of the input node IN. The external memory 28 stores decoded data or data required for decoding, and the memory controller 26 plays the role of controlling to read data from or write data to the external memory 28.

According to another aspect of the present invention, the pipelining decoding apparatus may be implemented without the PCI slave 20, the DMA unit 22, the header parser 24, the memory controller 26, and the external memory 28. A n aspect of the present invention is to perform F3 and F4 using a pipelining method, and the invention is not limited to the interconnection relationships and structures of the PCI slave 20, the DMA unit 22, the header parser 24, the memory controller 26, and the external memory 28.

A computer-readable recording medium for storing a computer program for controlling the pipelining decoding apparatus describe with respect to FIG. 1 will now be explained.

The computer program stored in the computer-readable recording medium to control the pipelining decoding apparatus for inputting and decoding the coded bitstream includes instructions for: reading corresponding neighboring pixel values of stored neighboring pixel values of a portion of pixel values of each of the recovered images corresponding to previous MBs; predicting motion in the picture corresponding to a current MB using the read neighboring pixel values; recovering an original image from the current MB using the result of the prediction of the motion and residue information; storing some of the pixel values of the recovered image corresponding to the current MB as neighboring pixel values to be used for predicting the motion of the next MB; and deblocking-filtering the recovered image. Here, the reading of the neighboring pixels, the prediction of the motion in the picture, the recovery of the original image, and the storing of some of current the pixel values are performed with respect to an nth MB, and simultaneously, deblocking-filtering is performed with respect to an n−1th MB.

The computer program may further include instructions for: receiving and entropy-decoding the coded bitstream; performing IQ with respect to the result of entropy-decoding; and performing IIT with respect to the result of IQ and determining the result of IIT as residue information. Here, the entropy-decoding of the coded bitstream with respect to an n+2th MB, the reading of the neighboring pixels, the prediction of the motion in the picture, the recovery of the original image, and the storing of some of the pixel values of the recovered image with respect to the nth MB, and the determination of the residue information with respect to an n+1th MB are executed at the same time.

Hereinafter, embodiments of the pipelining decoding apparatus and method of the present invention will be compared with the conventional decoding method with reference to the attached drawings.

FIG. 9 is a view for explaining the conventional decoding method. Here, 0th through 23rd MBs are shown, and P1, P2, P3, and P4 denote an entropy-decoding process, an IQ/IIT process, an MC process, and a deblocking-filtering process, respectively.

FIG. 10 is a view for explaining embodiments of the pipelining decoding apparatus and method. Here, 0th through 23rd MBs are shown, and P1, P2, P3, and P4 denote the entropy-decoding operation 40, the IQ/IIT operation 42, the MC operations 44, 46, 48, and 50, and the deblocking-filtering operation 52, respectively.

Referring to FIG. 9, in the conventional decoding method, P4 is performed with respect to the 8th MB, not to the 17th MB, during the performance of P3 with respect to the 18th MB. In other words, as described above, where intra-prediction is performed using the result of deblocking-filtering, an error occurs. Thus, in the conventional decoding method, P3 and P4 are performed by delaying one line to avoid an error. However, in the pipelining decoding apparatus and method disclosed herein, P3 is performed using the neighboring pixel values stored in the storage unit 14. Thus, P4 is performed with respect to the 17th MB during the performance of P3 with respect to the 18th MB. In other words, iP3 and P4 can be performed using a pipelining method without delaying even one line. Therefore, the decoding is processed much more quickly than by the conventional decoding method. In this case, as the number of slices of a picture increases, the decoding speed advantage of the pipelining decoding apparatus and method of the embodiments disclosed herein over that of the conventional decoding method improves further.

In addition, in the conventional decoding method, deblocking-filtering is not sequentially performed using the pipelining method. In other words, in the conventional decoding method, pixel values recovered using the result of intra-prediction are stored in an external memory (not shown), and corresponding pixel values are read from the external memory before deblocking-filtering is performed. Here, the pixel values stored in the external memory are X×3×1.5 bytes. For example, where X=720, the pixel values are 3240 bytes. Thus, very large pixel values must be stored in an internal memory of a decoder chip; however, deblocking-filtering can be performed together with other decoding operations using the pipelining method. Thus, pixel values for performing deblocking-filtering do not need to be separately stored in an external memory. Accordingly, the pixel values for deblocking-filtering do not need to be transmitted to the external memory 28 via a bus 30 and the memory controller 26. This increases the available capacity of the bus 30, i.e., improves the bandwidth of the bus 30, relieves the burden on the memory controller 26, and removes the delay of the transmission of data caused by accessing the external memory 28, allowing much faster decoding.

As described above, in the pipelining decoding apparatus and method according to embodiments of the present invention, and the computer-readable recording medium for storing a computer program for controlling the pipelining decoding apparatus, intra-prediction and deblocking-filtering can be performed at the same time using a pipelining method. As a result, decoding can be performed faster than by conventional decoding. Also, the bus bandwidth can be improved and the burden on the memory controller 26 can be relieved.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus for pipelining decoding a coded bitstream, the apparatus comprising:
    a storage unit which stores some of the pixel values of each of recovered images corresponding to previous macroblocks as neighboring pixel values;
    a motion predictor which:
        predicts motion in a picture corresponding to a current macroblock using the neighboring pixel values read from the storage unit,
        recovers an original image from the current macroblock using a result of the prediction of the motion in the picture and residue information, and
        stores some of the pixel values of the recovered image corresponding to the current macroblock in the storage unit; and
    a deblocking filter which deblocking-filters the recovered image,
    wherein the recovery of the original image with respect to an nth macroblock in the motion predictor and the deblocking-filtering of the recovered image corresponding to an (n−1)th macroblock in the deblocking filter are simultaneously performed.

2. The pipe lining decoding apparatus of claim 1, further comprising:
    an entropy decoder which entropy-decodes the coded bitstream; and
    an inverse quantization and inverse integer transform unit which:
        performs inverse quantization with respect to a result of the entropy-decoding, performs an inverse integer transform with respect to a result of the inverse quantization, and outputs a result of the inverse integer transform as the residue information, wherein the entropy-decoding of the coded bitstream with respect to an (n+2)th macroblock in the entropy decoder, the generation of the residue information with respect to an (n+1)th macroblock in the inverse quantization and inverse integer transform unit, and the recovery of the original image with respect to the nth macroblock in the motion predictor are performed simultaneously.

3. The pipelining decoding apparatus of claim 2, wherein the pipelining decoding apparatus is applied to a H.264/AVC CODEC.

4. The pipelining decoding apparatus of claim 3, further comprising:

a header parser which decodes a non-video coding layer network abstraction layer and a slice header in the unit of network abstraction layer or slice, respectively;

an external memory which stores data for decoding; and a memory controller which controls an operation of the external memory.

5. The pipelining decoding apparatus of claim 1, wherein the storage unit stores pixel values neighboring the current macroblock among pixel values of the recovered image corresponding to the previous macroblock horizontally neighboring the current macroblock as the neighboring pixel values, and pixel values neighboring the current macroblock among pixel values of each of the recovered images corresponding to the previous macroblocks vertically and diagonally neighboring the current macroblock as the neighboring pixel values.

6. The pipelining decoding apparatus of claim 5, wherein: the motion predictor stores the pixel values in at least one column in a rightmost position of the previous horizontally neighboring macroblock and at least one row in a lowest position of the previous vertically and diagonally neighboring macroblocks among the pixel values of the recovered image corresponding to the current macroblock in the storage unit.

7. The pipelining decoding apparatus of claim 5, wherein: where a picture has a width of X, the storage unit stores the neighboring pixel values having a length of more than 1.5 bytes and a maximum width of X.times.1.5.times.n', where n' represents a number of bytes with a value of 1, 2, or 3.

8. The pipelining decoding apparatus of claim 7, wherein: where a length of the macroblock is s, the storage unit stores the neighboring pixel values having a width of more than 1.5 bytes and a maximum length of 2s×1×1.5 bytes.

9. The pipelining decoding apparatus of claim 8, wherein: where a width of the macroblock is t, the storage unit stores the neighboring pixel values having a length of more than 1.5 bytes and a maximum width of t×1×1.5 bytes.

10. The pipelining decoding apparatus of claim 1, wherein the motion predictor analyzes the direction for predicting the motion in the picture and reads the neighboring pixel values corresponding to the analysis result from the storage unit.

11. The pipelining decoding apparatus of claim 1, wherein the motion predictor analyzes the types of the current and previous macroblocks and reads the neighboring pixel values corresponding to the analysis result from the storage unit.

12. A method of pipe lining decoding a coded bitstream, the method comprising:

reading corresponding neighboring pixel values among stored neighboring pixel values of some of pixel values of each of recovered images corresponding to previous macroblocks;

predicting motion in a picture corresponding to a current macroblock using the read neighboring pixel values;

recovering an original image from the current macroblock using a result of the prediction of the motion in the picture and residue information;

storing some of the pixel values included in the recovered image corresponding to the current macroblock; and deblocking-filtering the recovered image, wherein the reading of the corresponding neighboring pixel values, the prediction of the motion in the picture, the recovery of the original image, and the storing of some of the pixel values of the recovered image are performed with respect to an nth macroblock, and simultaneously, the deblocking-filtering of the recovered image is performed with respect to an (n−1)th macroblock, wherein the method is performed by a processor.

13. The pipelining decoding method of claim 12, further comprising:

entropy-decoding the coded bitstream;

performing inverse quantization with respect to the result of the entropy-decoding; and performing an inverse integer transform with respect to the result of the inverse quantization and determining the result of the inverse integer transform as the residue information, wherein the entropy-decoding of the coded bitstream with respect to an (n+2)th macroblock, the reading of the corresponding neighboring pixel values, the prediction of the motion in the picture, the recovery of the original image, and the storing of some of the pixel values of the recovered image with respect to the nth macroblock, and the performance of inverse quantization and inverse integer transform with respect to an (n+1)th macroblock are performed simultaneously.

14. The method of claim 12, wherein pixel values used for deblocking-filtering are not transmitted to an external memory.

15. The method of claim 12, wherein a bitstream to be decoded is coded in units of a network abstraction layer.

16. The method of claim 12, wherein:

reading comprises reading, from a storage unit, corresponding neighboring pixel values among stored neighboring pixel values of some of pixel values of each of recovered images corresponding to previous macroblocks;

predicting motion includes predicting motion, by a motion predictor, in a picture corresponding to a current macroblock using the read neighboring pixel values;

recovering includes recovering, with the motion predictor, an original image from the current macroblock using a result of the prediction of the motion in the picture and residue information;

storing includes storing, with the motion predictor, some of the pixel values included in the recovered image corresponding to the current macroblock; and deblocking-filtering includes deblocking-filtering, by a deblockinging filter, the recovered image.

17. A computer-readable medium storing a computer program with computer executable instructions for controlling a pipelining decoding apparatus for decoding a coded bitstream, comprising:

reading corresponding neighboring pixel values among stored neighboring pixel values of some of pixel values of each of recovered images corresponding to previous macroblocks;

predicting motion in a picture corresponding to a current macroblock using the read neighboring pixel values;

recovering the original image from the current macroblock using the result of the prediction of the motion in the picture and residue information;

storing some of the pixel values included in the recovered image corresponding to the current macroblock; and deblocking-filtering the recovered image, wherein the reading of the corresponding neighboring pixel values, the prediction of the motion in the picture, the recovery of the original image, and the storing of some of the pixel values of the recovered image are performed with respect to an nth macroblock, and simultaneously, the deblocking-filtering of the recovered image is performed with respect to an (n−1)th macroblock, wherein the computer executable instructions are processed by a processor.

18. The computer-readable medium of claim 17, wherein the computer program further comprising:

entropy-decoding the coded bitstream;

performing inverse quantization with respect to the result of the entropy-decoding; and performing inverse integer transform with respect to the result of the inverse quantization, and determining the result of the inverse integer transform as the residue information, wherein the entropy-decoding of the coded bitstream with respect to an (n+2)th macroblock, the reading of the corresponding neighboring pixel values, the prediction of the motion in the picture, the recovery of the original image, and the storing of some of the pixel values of the recovered image with respect to the nth macroblock, and the performance of inverse quantization and inverse integer transform with respect to an (n+1)th macroblock are performed simultaneously.

* * * * *